March 31, 1942.  F. FREIMANN ET AL  2,278,367
FILM REWIND FOR PICTURE PROJECTOR
Filed Jan. 31, 1940  2 Sheets-Sheet 1
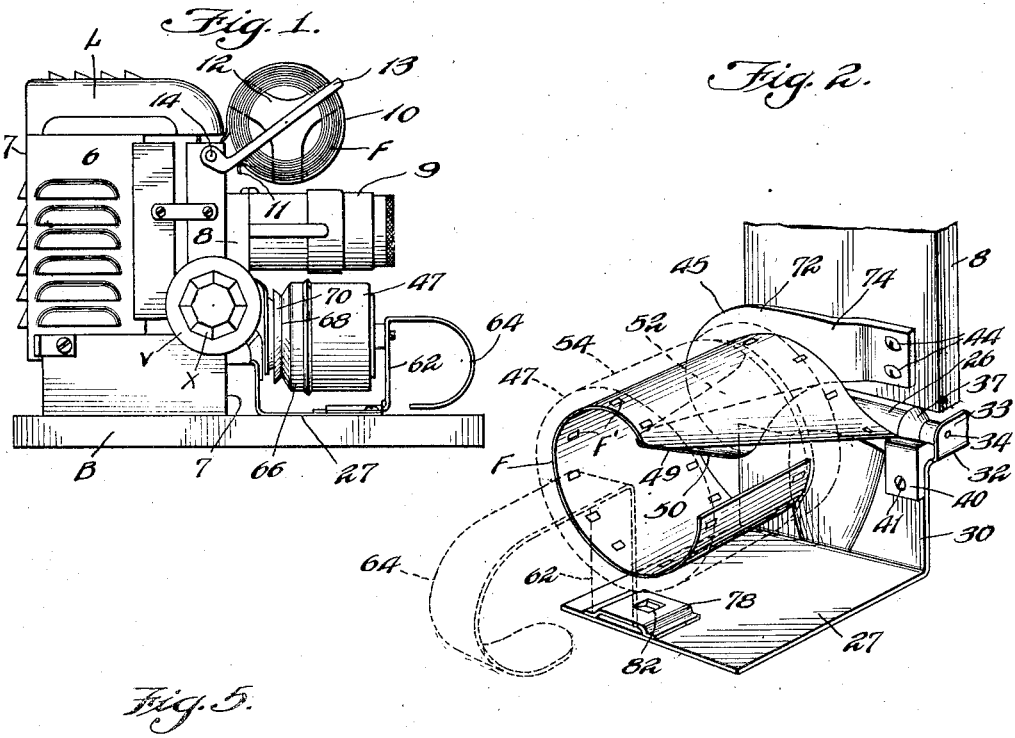
INVENTOR.
Frank Freimann
By William E. Kierulff
Parkinson + Lane ATTORNEYS.

March 31, 1942.  F. FREIMANN ET AL  2,278,367
FILM REWIND FOR PICTURE PROJECTOR
Filed Jan. 31, 1940   2 Sheets-Sheet 2

INVENTOR.
Frank Freimann
BY William E. Kierulff
Parkinson + Lane ATTORNEYS.

Patented Mar. 31, 1942

2,278,367

UNITED STATES PATENT OFFICE 2,278,367

FILM REWIND FOR PICTURE PROJECTORS

Frank Freimann and William E. Kierulff, Fort Wayne, Ind., assignors to The Magnavox Company, Inc., Fort Wayne, Ind., a corporation of Indiana Application January 31, 1940, Serial No. 316,462

5 Claims. (Cl. 88—18.7)

This invention relates to film guiding and rewinding means such as used in connection with projectors by which images are projected for demonstrative, educational and other purposes. In the operation of such projectors it is very important to efficiently and conveniently dispose of and rewind the film immediately as it passes through the discharge from the projector.

An object of the invention, therefore, is the provision of a projector with means whereby a film can be conveniently rewound immediately as it passes through the projector discharge and protected from damage by outside elements.

A further object of the invention is the provision of guiding and rewinding means in which the film is rewound so that it is ready for the next demonstration without any additional rewinding operation.

A still further object of the invention is the provision of a container for receiving the rewound film which can be readily detached from the projector so as to facilitate quick removal of the film for storage or reshowing.

The present invention provides guiding and rewinding means for the projected film in which a container for so receiving the film is positioned immediately adjacent the front of the projector housing, the major portion of the winding means being housed within the container. By this arrangement the exposure of the film as it passes from the projector to the winding means is avoided and the chance of damage thereto eliminated. This arrangement of the rewinding container with respect to the projector is rendered possible by the fact that the mechanism employed for turning the film is capable of completing the rewinding operation with the film being turned but 90° from the position it occupies whilst being fed through and discharged from the projector.

Further objects of the invention will become apparent from the following description of the device which is given by way of example only, it being understood that any modification within the scope of the invention may be utilized without departing from the spirit of the invention.

In the drawings:

Fig. 1 is a side view of a projector incorporating film guiding and rewinding means embodying one form of our invention;

Fig. 2 is a detached perspective view of the guiding and rewinding means shown in Fig. 1;

Fig. 5 is a front view of the film guiding and rewinding means with the container for receiving the projected film removed;

Fig. 6 is a detached perspective view of the primary film turning device; and

Fig. 7 is also a perspective view of the means which initiates the turning of the film as it is discharged from the projector slot.

Figure 3:
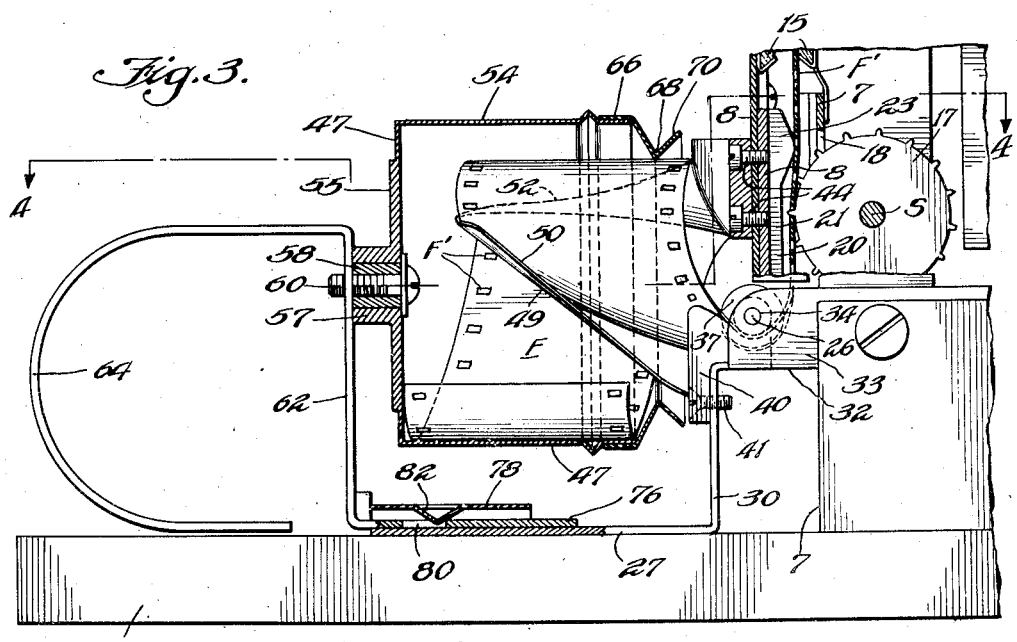
Fig. 3 is a vertical section of the guiding and rewinding means on a somewhat enlarged scale, the figure also showing part of the projector.

For the sake of convenience the present guiding and rewinding means is illustrated as applied to a projector of the type forming the subject matter of United States Letters Patent No. 2,067,835, issued January 12, 1937. It is to be understood, however, that the invention may be applied to any type of film projector from which images are adapted to be projected onto a screen or other desirable surface, and the following description of the projector is accordingly given only by way of example.

The projector more particularly shown in Fig. 1 comprises a generally rectangular housing L with opposite side walls 6 and front and rear walls 7. To the front wall is hinged a gate 8 on the front of which is mounted a tubular projection 9 containing part of the lens system. As shown, the projector is mounted in its entirety upon a base support B. Extending upwardly from the front wall 7 of the projector is a thin plate which is curved around to form a generally cylindrical container 10 adapted to receive a roll of film F which is to be fed through the projector. The end of the thin plate is turned back upon itself as shown at 11 so as to avoid damage to the film as it is unwound from the container.

One side of the container is bridged by a Y-shaped plate 12 whilst at the opposite side of the container is arranged a movable arm 13 pivoted by a pin 14 to a side wall 6 of the projector, this arm when in its vertical position permitting the film to be inserted into the container 10, whereafter, on the arm being moved to the position shown in Fig. 1, the film will be retained within the container 10 without possibility of displacement.

The film, as it is unrolled from the container 10, is passed downwardly behind the gate 8 and along the front wall 7 of the projector between guide blocks of glass forming, if desired, part of the lens system, to the film guiding and rewinding means hereinafter more fully described. The lower portions of said guide blocks appear in the upper right-hand portion of Fig. 3 where they are indicated by the reference numeral 15.

Figure 4:
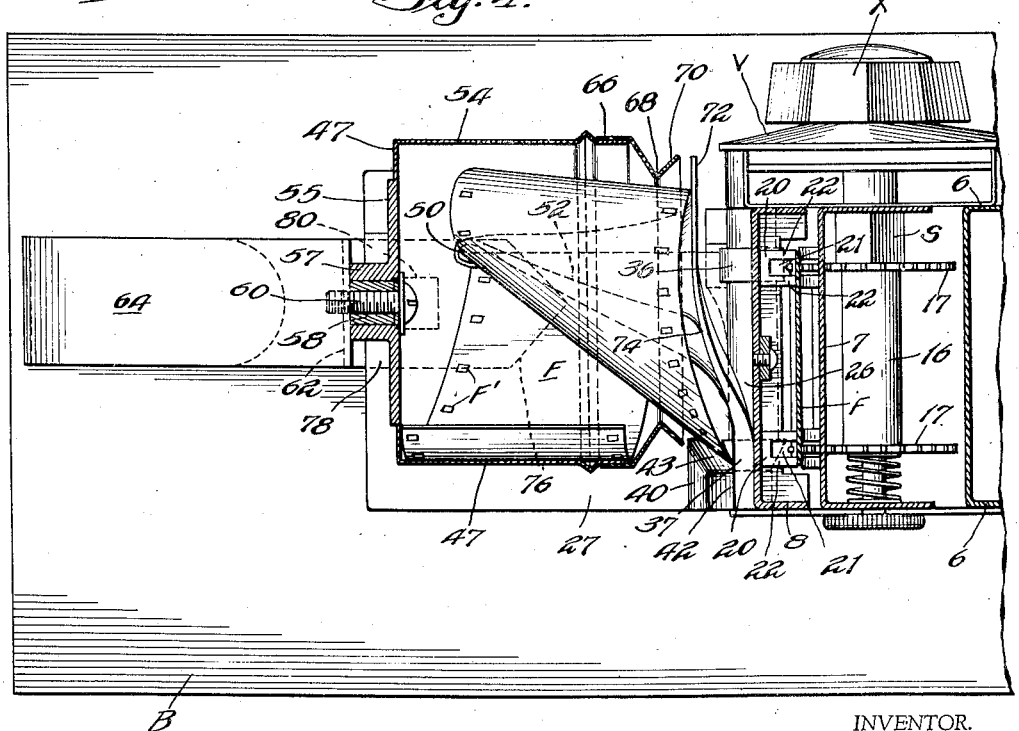
Fig. 4 is a section taken on line 4—4 of Fig. 3, looking in the direction of the arrows.

The forward movement of the film through the projector to the guiding and rewinding means of the present invention may be accomplished in any suitable manner, for example, as described in the above mentioned United States Patent No. 2,067,835. Thus, for the purpose of the present disclosure it may be stated that in the lower front region of the projector and to the rear of the front wall thereof a shaft S (Fig. 3) may be provided which extends transversely across the projector and through spaced bearings provided by openings in the opposed side walls 6 of the projector. Fast on the shaft S and midway between the side walls of the projector is a spool 16 (Fig. 4) having end flanges in the form of sprocket wheels 17 (Figs. 3 and 4). A portion of these wheels 17 projects through vertical slots 18 formed in the front wall 7 of the projector so that the projecting teeth can engage in the edge openings F' of the film and thus move the latter forward on rotation of the shaft S.

The shaft S and spool 16 can be rotated manually by the operation of a knob X or disk V fast thereon (Fig. 1) or by a remote control device in a manner fully described in the above mentioned United States Patent No. 2,067,835, or otherwise as may be found convenient.

In order to ensure that the edge openings F' in the film are always and properly maintained in engagement with the teeth of the sprocket wheels 17, on the inside of the gate 8 and opposite each sprocket wheel is provided a film contact block 20. Each block is formed with a vertical slot 21 of such width that it will freely house the projecting teeth of the opposed sprocket wheel when the gate 8 is closed and the two walls 22 of each block defined by the slot 21 are formed with a projection 23. The two projections of each block press the film lightly backwards above the adjacent sprocket wheel (see Fig. 3) and thus prevent disengagement of the film from the sprocket teeth, thereby ensuring positive feeding of the film. It is to be noted that the blocks 20 are so located that their projections 23 contact only with the edges of the film adjacent the slots therein in contradistinction to that part of the film on which the pictures to be projected appear.

After the film passes over the sprocket wheels 17 in its passage through the projector it is now in position to be led to the guiding and rewinding means and this means will accordingly now be described.

In front of the front wall 7 of the projector and below the gate 8 is mounted a transverse shaft 26. The mounting for the shaft in this position can be conveniently provided for by a bracket-like member which comprises a horizontal portion 27 secured to the base support B, a vertical portion 30 and a second horizontal portion 32, the side edges 33 of the latter being turned up vertically and provided with openings 34 in which the ends of the shaft 26 can be suitably retained in such manner as to allow of the rotation of the shaft.

The shaft 26 is provided with two preferably integral collars 36 and 37. One of these collars, namely, the collar 36 is of cylindrical shape and is disposed in line with one of the sprocket wheels, whilst the other collar, namely, the collar 37, takes the form of a truncated cone with its base facing the collar 36 and is disposed in line with the other sprocket wheel 17.

Cooperating with the conical collar 37 is the initial curling backing member 40, the vertical leg of which is fastened by a screw 41 to the vertical portion 30 of the bracket-like member, whilst the horizontal leg seats upon the second horizontal portion 32 of the bracket-like member. The upper surface 42 of said block 40 (see Fig. 7) is hollowed out on the arc of a circle and further the inner portion of said surface is bevelled off as at 43 so as to be complementary to the surface of the conical collar 37.

With this arrangement one edge of the film is guided downwardly between the cylindrical collar 36 and the second horizontal portion 32 of the bracket-like member where it reaches a plane which is perpendicular, or approximately so, to that it previously occupied. The other edge of the film, on the other hand, passes between the conical collar 37 and the complementary bevelled portion 43 of the block 40, with the result that as it emerges it is curled upwardly and occupies a plane which is at an angle to that occupied by the other edge of the film. In other words, it is curled angularly upward. A twisting or turning movement is thus imparted to that edge of the film which has emerged from between the conical collar 37 and the initial curling block 40 and thus the first step in the rewinding of the film has taken place.

Attached by screws 44 to the front face of the gate 8 is a main film winding and guiding member 45 generally horizontally disposed and extending forwardly from the gate 8 (see Figs. 2 and 6) which is adapted to enter into and cooperate with the rewinding film container 47, hereinafter more fully described.

The member 45 projects forwardly from the gate 8 and presents, when viewed in side elevation (see Fig. 3), a triangular configuration, the base of the triangle being located adjacent the gate and its apex forwardly thereof. The lower edge 49 of the member 45 is turned over so as to provide a film guide 50 which inclines upwardly and outwardly from the gate 8, the guide receiving that edge of the film which has passed the collar 36 and guiding it in an upward direction towards the apex of the prong 45. The upper edge 52 of the member 45 is somewhat curved or rounded so that as the curling or twisting movement of the film progresses the latter will slide easily thereover and into the container 47 with the cooperation of the latter, as will hereinafter be described. It is to be noted that whereas the groove 50 extends outwardly in a plane at a right angle to the gate 8, the upper edge 52 of the member 45 extends outwardly in a plane which approximates an angle of 45° to the gate, this angular disposition of the upper edge 52 facilitating the turning-over movement of the film during its passage towards and into the container 47.

The container 47 comprises a hollow cylindrical shell 54 which is closed at the end remote from the projector by a plate 55 to which there is fixed a hub portion 57. This hub portion 57 has a bushing 58 through which a screw 60 extends to rotatably secure the container 47 to a vertical arm 62, preferably formed integral with a handle-like member 64 by which the container can be placed in position on or removed from the base support B.

The opposite end of the container 47 faces the projector and is open so as to permit the entry of the member 45 and the film thereinto. In order to further the curling or twisting movement already imparted to the film by the collar 37 and cooperating block 40, as hereinbefore described, the container at said open end is provided with a detachable open-ended cap 66 having a neck 68 and a rim 70 which flares outwardly therefrom.

The base of the member 45 is provided with an arcuate flange 72 which extends up to the upper edge 52 of said member and is there curved backwardly, as indicated at 74 in Figs. 2 and 6, until it merges into that portion of said member secured by the screws 44 to the gate 8.

The neck 68 and flared rim 70 of the cap 66 in combination with flange 72 of the member 45 performs the important function of continuing and furthering the curling, twisting and winding movement commenced by the conical collar 37 and the block 40, the flared rim first of all coming into play to enhance the upward movement of the edge of the film which has emerged from between the collar 37 and block 40 and then, as the leading end of the film approaches the upper edge 52 of the member 45, the flange 72, commencing at about the curved portion 74, thrusts the said edge of the film towards the container, whilst at the same time, somewhat inwardly of said edge, the neck 68 acts to press the film downwardly over the upper edge 52 of the member 45 following the curvature of said neck. Meanwhile, the other edge of the film having reached the top of the groove 50 begins to feed off from the apex of the member 45 into the container. As the feeding continues the film builds up in convolutions in the container. The net result of the influence of the various elements just described is that the film follows what may be briefly designated a spiral or helical course into the container 47.

As the leading end of the film enters the container it curls around between the member 45 and the inner wall of the container 47 until it lies flush against said inner wall. See Figs. 3 and 4. In this manner the film is so fed into said container as to obviate the necessity of rewinding, that is to say, the first pictures on the film form the outer coil while the succeeding pictures are to be found on the inner coils in the correct order of their succession. When several coils have been formed the container will start to rotate about the screw 60 due to the increasing pressure of the coils against the inner wall of the container 47, thereby eliminating any relative movement between the several layers of film and thus preventing scratching and other detrimental effects.

When the film is completely rewound the container 47 is removed from the projector. For this purpose one has only to pull on the handle portion of the member 64. This member has a horizontal tongue 76 which fits into a socket 78 carried by the horizontal portion 30 of the bracket member. The tongue 76 has an opening 80 adapted to receive a spring catch 82 carried by the socket to lock the container 47 in position, whilst at the same time permitting removal of the member 64 and the container 47 carried thereby, when necessary.

Particular attention is directed to the fact that when container 47 is in its operative position on the base support B the flared rim 70 of the cap 66 is almost in direct engagement with the front of the projector. The advantage obtained by this arrangement is important in that as the film emerges from beneath the shaft 26 to all intents and purposes it is immediately housed and sheltered within the container 47; thus, its exposure to the atmosphere and to impurities therein, such as dust, is avoided, and all possibility of damage eliminated. This close placing of the rewinding container is rendered possible by the fact that the mechanism employed for twisting the film is capable of completing the rewinding operation with the film being turned through an angle of but 90° from the position which it occupies whilst being fed through the projector.

The above described structure provides film guiding and rewinding mechanism which can be added to the usual base plate with which a film projector is provided, and this without enlarging the latter so that no additional space is involved. The mechanism is simple in construction, positive in action and low in cost of manufacture.

Having thus disclosed the invention, we claim:

1. For use in connection with a film projector, a rewind shaft for receiving the film as it is projected, means on and cooperating with said shaft for initially curling one edge of the film with relation to the other edge thereof, and a rotatable rewind container positioned adjacent to said shaft, said container having a restricted neck and a flared flange which cooperate to continue the curl imparted to the film and guide it in the form of a spiral or helix into the container.

2. For use in combination with a film projector, film rewinding mechanism comprising an open-ended container for receiving the film to be rewound positioned immediately adjacent to the front face of the projector, a shaft journaled in the projector front, a collar on said shaft and a complemental block positioned therebeneath, said collar and block being located to engage one edge of the projected film and initially curl it upwardly with relation to the other edge of the film, a primary curling and guiding member projecting forwardly from the front face of the projector and housed within said container and means carried by the container which, in cooperation with said member, further the curling movement initially imparted to the film by said collar and block and guide the film into the container with a spiral or helical motion.

3. In combination with a film projector, a container for receiving projected film, having an open end through which the film is fed thereinto, disposed adjacent the front of the projector, means for imparting a preliminary curl to one edge of the film mounted on said projector front, a primary curling and guiding member mounted on and projecting forwardly from said projector front, means on said member for guiding the other edge of the film, a cap for the open end of said container for continuing the twisting movement of the film, and means, also carried by said member, cooperating with said cap to guide the film into said container in such manner that the pictures thereon are in proper succession for re-showing.

4. In combination with a projector for continuous film, a shaft for receiving projected film, a cylindrical collar on said shaft adjacent one edge of the film, a conical collar on said shaft and a complementary conical guide block beneath said conical collar disposed adjacent the other edge of the film for curling said edge of the film, a primary curling member extending forwardly from the projector above said shaft, an inclined groove on said member for guiding the first mentioned edge of the film, an arcuate flange at the base of said member, a removable container for receiving the film to be rewound fitted over said primary curling member, an open cap carried by said container and having an outwardly flared rim and a restricted neck, said flared rim being located in close proximity to said flange, and said rim, neck and flange cooperating to further the curl imparted to the film by the conical collar and block to guide the film into the container in reversed coil form.

5. In a film projector, a base support, a bracket-like member secured to said support, a shaft also carried by said bracket-like member for receiving the projected film and curling one edge thereof with relation to the other edge thereof, a container for said film, and means carried by said bracket member for demountably positioning said container immediately adjacent said shaft.

FRANK FREIMANN.
WILLIAM E. KIERULFF.